United States Patent
Carmichael et al.

(10) Patent No.: US 9,511,909 B2
(45) Date of Patent: *Dec. 6, 2016

(54) SCAVENGING OXYGEN

(75) Inventors: Adrian John Carmichael, Liverpool (GB); Andrew Stuart Ovenrend, Bolton (GB); Mark Rule, Roswell, GA (US); Ronald James Valus, Valley View, OH (US); Christine Leeming, Cheshire (GB); James Stuart Leeming, legal representative, Cheshire (GB); Steven Burgess Tattum, Cheshire (GB)

(73) Assignee: COLORMATRIX HOLDINGS, INC., Wilmington, DE (US)

( * ) Notice: Subject to any disclaimer, the term of this patent is extended or adjusted under 35 U.S.C. 154(b) by 398 days.

This patent is subject to a terminal disclaimer.

(21) Appl. No.: 13/263,803

(22) PCT Filed: Apr. 8, 2010

(86) PCT No.: PCT/GB2010/050609
§ 371 (c)(1),
(2), (4) Date: Jan. 30, 2012

(87) PCT Pub. No.: WO2010/116194
PCT Pub. Date: Oct. 14, 2010

(65) Prior Publication Data
US 2012/0114529 A1    May 10, 2012

Related U.S. Application Data

(60) Provisional application No. 61/167,923, filed on Apr. 9, 2009.

(51) Int. Cl.
*B01D 53/00*    (2006.01)
*B01D 53/34*    (2006.01)
(Continued)

(52) U.S. Cl.
CPC .............. *B65D 51/244* (2013.01); *A23L 2/42* (2013.01); *A23L 3/3436* (2013.01);
(Continued)

(58) Field of Classification Search
CPC ....... B01D 53/00; B01D 53/34; B01D 53/346; B01D 61/00; B01D 63/00; B01J 19/00; B01J 19/24; B01J 35/00; B01J 35/02; B65D 1/00; B65D 23/00; B65D 27/00; B65D 39/00; B65D 51/24; B65D 51/244; B65D 81/24; B65D 81/26; B65D 81/266; B65D 6551/24; B65D 6551/244; B32B 1/00; C10K 1/00; A23L 2/42; A23L 3/34; A23L 3/3409; A23L 3/3418–3/3436; Y02E 60/30; Y02E 60/34
(Continued)

(56) References Cited

U.S. PATENT DOCUMENTS 3,419,400 A    12/1968    Hayhurst et al.
3,712,848 A    1/1973    Casey, Jr. et al.
(Continued)

FOREIGN PATENT DOCUMENTS

EP    0066199 A2    12/1982
EP    0328337 A1    8/1989
(Continued)

OTHER PUBLICATIONS

European Search Report from EP 12 18 1561.
European Search Report from EP 12 18 1527.
European Search Report from EP 12 18 1552.

*Primary Examiner* — Natasha Young
(74) *Attorney, Agent, or Firm* — Fay Sharpe LLP

(57) ABSTRACT

A closure (40) includes a body (42) with a threaded portion (44) for engaging the closure with a container. Inwards of portion (44) is a liner (46) comprising a hydrogen generating
(Continued)

device, wherein the liner includes one layer (48) which incorporates a hydride dispersed in a polymeric matrix and, on opposite sides of layer (48) are arranged PET layers (50, 52). Layer (50) acts as a control layer to control the rate of passage of water vapour from the beverage in the container to the hydride containing layer (48) and thereby control generation of hydrogen by the hydrogen generating device. In use, water vapour passes through layer (50) and contacts the hydride associated with layer (48) which results in production of molecular hydrogen which combines with oxygen. Thereafter, a reaction between the hydrogen and oxygen takes place, catalysed by a catalyst associated with the container thereby to scavenge the oxygen.

26 Claims, 3 Drawing Sheets

(51) Int. Cl.

| | | |
|---|---|---|
| *B01D 61/00* | (2006.01) | |
| *B01D 63/00* | (2006.01) | |
| *B65D 1/00* | (2006.01) | |
| *B65D 23/00* | (2006.01) | |
| *B65D 39/00* | (2006.01) | |
| *B65D 51/24* | (2006.01) | |
| *B65D 81/24* | (2006.01) | |
| *B65D 81/26* | (2006.01) | |
| *B01J 19/00* | (2006.01) | |
| *B01J 19/24* | (2006.01) | |
| *A23L 2/42* | (2006.01) | |
| *A23L 3/3436* | (2006.01) | |
| *B01J 35/00* | (2006.01) | |
| *B01J 35/02* | (2006.01) | |
| *C10K 1/00* | (2006.01) | |
| *A23L 3/34* | (2006.01) | |
| *A23L 3/3409* | (2006.01) | |
| *A23L 3/3418* | (2006.01) | |
| *A23L 3/3427* | (2006.01) | |

(52) U.S. Cl.
CPC ........ *B65D 81/266* (2013.01); *A23V 2002/00* (2013.01); *Y02E 60/36* (2013.01); *Y10T 29/49826* (2015.01)

(58) Field of Classification Search
USPC . 422/105, 129, 211; 215/228, 229; 206/205, 213.1, 524.1, 524.3; 48/61; 426/106
See application file for complete search history.

(56) References Cited

U.S. PATENT DOCUMENTS

| | | | |
|---|---|---|---|
| 4,279,350 A | 7/1981 | King | |
| 5,952,066 A * | 9/1999 | Schmidt | B65D 1/0215 252/188.24 |
| 6,194,042 B1 * | 2/2001 | Finkelstein | B32B 27/08 215/348 |

FOREIGN PATENT DOCUMENTS

| | | |
|---|---|---|
| EP | 1 539 882 B1 | 10/2006 |
| GB | 1005651 | 9/1965 |
| GB | 1069929 | 5/1967 |
| GB | 1188170 | 4/1970 |
| WO | 9722469 | 6/1997 |
| WO | 9815966 | 4/1998 |
| WO | 9905922 | 11/1999 |
| WO | WO 2008/090354 A1 * | 7/2008 |

* cited by examiner

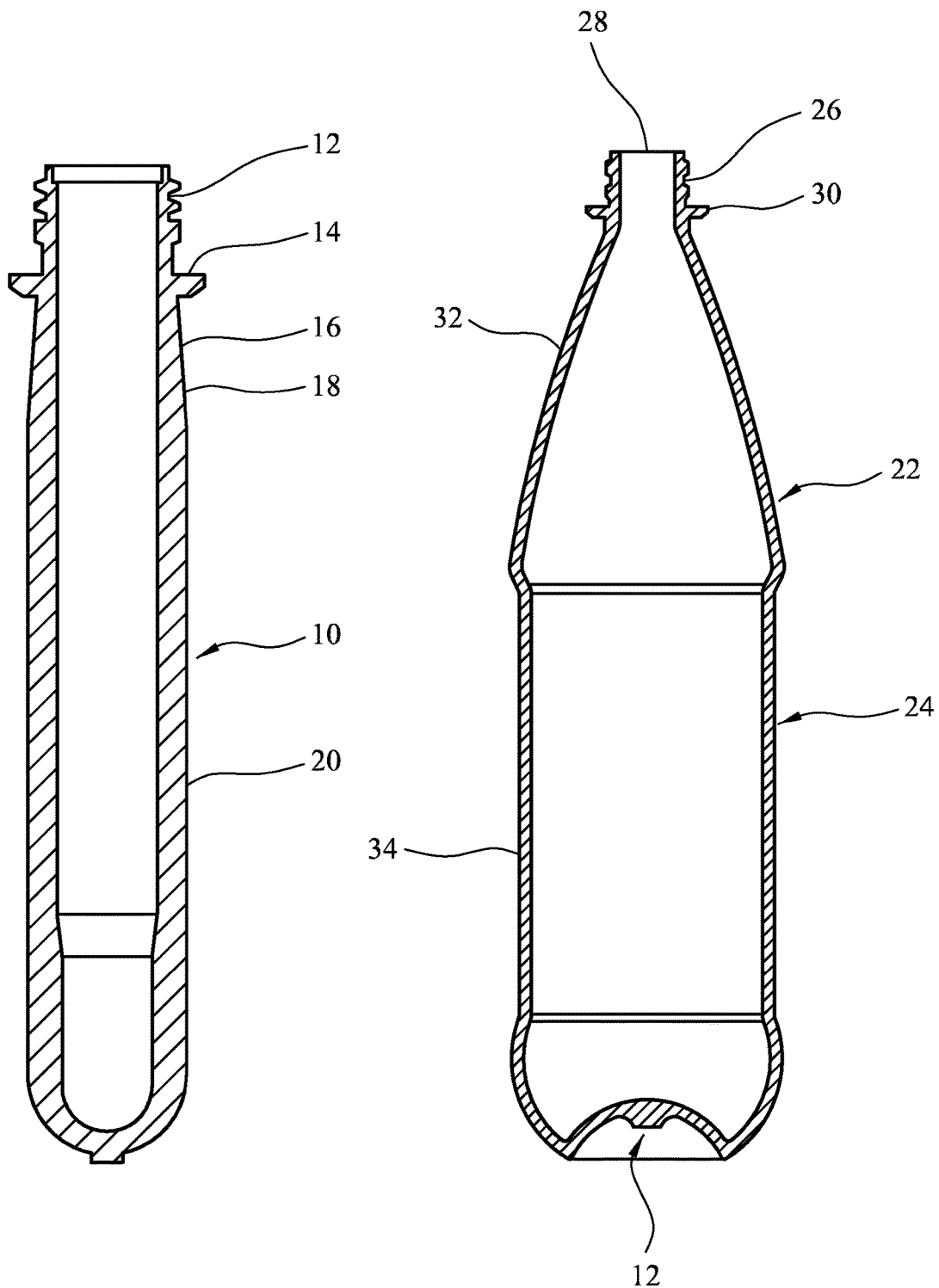

SCAVENGING OXYGEN

This application is a National Stage Entry of PCT/GB2010/050609, filed Apr. 8, 2010, and claims priority from U.S. Provisional Application Ser. No. 61/167,923, filed Apr. 9, 2009.

This invention relates to scavenging oxygen and particularly, although not exclusively, relates to the scavenging of oxygen in containers, for example food or beverage containers.

Polymers such as poly(ethylene terephthalate) (PET) are versatile materials that enjoy wide applicability as fibers, films, and three-dimensional structures. A particularly important application for polymers is for containers, especially for food and beverages. This application has seen enormous growth over the last 20 years, and continues to enjoy increasing popularity. Despite this growth, polymers have some fundamental limitations that restrict their applicability. One such limitation is that all polymers exhibit some degree of permeability to oxygen. The ability of oxygen to permeate through polymers such as PET into the interior of the container is a significant issue, particularly for foods and beverages that are degraded by the presence of even small amounts of oxygen. For the purpose of this disclosure, permeable means diffusion of small molecules through a polymeric matrix by migrating past individual polymer chains, and is distinct from leakage, which is transport through macroscopic or microscopic holes in a container structure.

Besides food and beverages, other products affected by oxygen include many drugs and pharmaceuticals, as well as a number of chemicals and even electronics. In order to package these oxygen-sensitive products, brand owners have historically relied on the use of glass or metal packaging. More recently, brand owners have begun to package their products in plastic packages which incorporate either passive barriers to oxygen and/or oxygen scavengers. Generally, greater success has been achieved utilizing oxygen scavengers; however, oxygen scavenging materials heretofore have suffered from a number of issues. In particular, oxygen scavengers utilized to date rely on the incorporation of an oxidizable solid material into the package. Technologies utilized include oxidation of iron (incorporated either in sachets or in the container sidewall), oxidation of sodium bisulfite, or oxidation of an oxidizable polymer (particularly poly(butadiene) or m-xylylenediamine adipamide). All of these technologies suffer from slow rates of reaction, limited capacity, limited ability to trigger the scavenging reaction at the time of filling the container, haze formation in the package sidewall, and/or discoloration of the packaging material. These problems have limited the use of oxygen scavengers in general, and are especially significant for transparent plastic packaging (such as PET) and/or where recycling of the plastic is considered important.

Co-pending publication number WO2008/090354A1 discloses a container comprising an active substance which is incorporated in the container and is arranged to react with moisture in the container to release molecular hydrogen. However, the active substances used may react too quickly with water or develop protective oxide coatings. To address this problem, WO2008/090354A1 disperses the active substance in a polymeric matrix which is said to allow the controlled slow release of hydrogen. However, a limitation of this approach is that there is a significant reduction in the rate of hydrogen generation rate over a 3 months timeframe. Therefore, to maintain effective oxygen scavenging the system has to be designed such that the hydrogen generation rate does not fall below the critical rate needed to scavenge all the ingressing oxygen. This is achieved by the initial rate of hydrogen generation being in significant excess of what is required to scavenge the oxygen earlier in the shelf-life.

In addition, it can be difficult to produce combinations of matrix material and active substances consistently and, accordingly, hydrogen release rates may unintentionally vary between batches of the combinations. In some circumstances it can be difficult to achieve a desired release rate in combination with a desired shelf life and to accommodate the matrix material/active substance combination discretely in a container, for example in a closure thereof. In such circumstances it is necessary to use a hydrogen generating matrix containing high levels of active substance (for example up to 50% hydrogen generating active) but, in such circumstances, the rate of hydrogen release rate would be too high.

This invention is based on the discovery that by separating a hydrogen generating material from the source of water vapour using a control means, a construction can be produced that has a reduced rate of change of hydrogen generation rate with time. Therefore, using a control means can increase the efficiency of the system and can be used to either increase shelf-life or lower the active level of hydrogen generating material (and associated cost) necessary to achieve the desired shelf life.

It is an object of the present invention to address problems associated with scavenging of oxygen.

According to a first aspect of the invention, there is provided a container comprising:
(i) a hydrogen generating means comprising an active material arranged to generate molecular hydrogen on reaction with moisture;
(ii) a control means for controlling passage of moisture from the container to the hydrogen generating means.

Said control means is preferably arranged to control passage of moisture suitably so as to reduce the rate of hydrogen generation by said hydrogen generating means compared to the rate in the absence of said control means. In this case, the control means suitably defines the rate determining step for passage of moisture to the active material of the hydrogen generating means, rather than the rate determining step being defined by other features of the hydrogen generating means, for example the properties of a matrix material hereinafter described with which the active material may be associated.

Comparing the rates as aforesaid can readily be done simply be providing two containers which are identical except that one includes a control means as described and one does not include such a control means.

Providing a control means as described introduces substantial flexibility which allows control of the rate of production of hydrogen by the hydrogen generating means and tailoring of the time over which hydrogen is generated, which determines the shelf-life of the container. For example, to achieve a long shelf-life a relatively large amount of active material may be associated with a matrix and by controlling passage of moisture to the hydrogen generating means, the rate of hydrogen generation is controlled as is the rate of consumption of the active material. In contrast, in the absence of the control means, the relatively large amount of active material would produce hydrogen at a quicker rate and would be consumed quicker meaning the shelf-life of the container would be less.

Said control means is preferably arranged to control a first evolution ratio, wherein the first evolution ratio is defined as:

$$\frac{\text{the rate of evolution of hydrogen in the container over a selected initial 5 day period}}{\text{the rate of evolution of hydrogen in the container over a second 5 day starting 85 days after the end of the selected initial period}}$$

Said first evolution ratio is suitably less than 4, preferably less than 3, more preferably less than 2. The ratio is suitably greater than 0.5, preferably greater than 0.8, and more preferably 1 or greater.

Said selected initial 5 day period may be within 45 days, suitably within 30 days, 15 days, 10 days or 5 days of filling of the container, for example with a beverage.

Said control means is preferably arranged to control a second evolution ratio, wherein the second evolution ratio is defined as:

$$\frac{\text{the rate of evolution of hydrogen in the container over a selected initial 5 day period}}{\text{the rate of evolution of hydrogen in the container over a second 5 day period starting 180 days after the end of the selected initial period}}$$

Said second evolution ratio is suitably less than 4, preferably less than 3, more preferably less than 2. The ratio is suitably greater than 0.5, preferably greater than 0.8, and more preferably 1 or greater Said control means is preferably arranged to control a third evolution ratio, wherein the third evolution ratio is defined as:

$$\frac{\text{the rate of evolution of hydrogen in the container over a selected initial 5 day period}}{\text{the rate of evolution of hydrogen in the container over a second 5 day period starting 270 days after the end of the selected initial period}}$$

Said third evolution ratio is suitably less than 4, preferably less than 3, more preferably less than 2. The ratio is suitably greater than 0.5, preferably greater than 0.8, and more preferably 1 or greater.

Both the first and second evolution ratios may apply. Preferably, the first, second and third evolution ratios apply.

Suitably, the only path for passage of moisture to the hydrogen generating means is via said control means. Said control means preferably defines an uninterrupted barrier between the hydrogen generating means and a source of moisture in the container.

Unless otherwise stated, water permeability described herein is measured using (American Society for Testing Materials Annual Book of Standards) ASTM procedure E96 Procedure E at 38° C. and relative humidity of 90%.

Said hydrogen generating means may comprise a matrix with which said active material is associated, for example embedded or preferably dispersed. Said matrix may comprise a matrix material, for example a polymeric matrix material, selected based on the solubility of moisture in the bulk polymer and which is suitably chemically inert to the active material. Suitable matrix materials have a water vapour permeability of greater than 0.2 g.mm/m$^2$.day, suitably greater than 0.4 g.mm/m$^2$.day, preferably greater than 0.6 g.mm/m$^2$.day, more preferably greater than 0.8 g.mm/m$^2$.day, and especially greater than 1.0 g.mm/m$^2$.day. Said matrix material may comprise a blend comprising, for example, at least two polymeric materials.

The water vapour permeability may be less than 5 g.mm/m$^2$.day, less than 4 g.mm/m$^2$.day or less than 3 g.mm/m$^2$.day. Suitable polymeric matrix materials include but are not limited to ethylene vinyl acetate, styrene-ethylene-butylene (SEBS) copolymers, Nylon 6, styrene, styrene-acrylate copolymers, polybutylene terephthalate, polyethylene, polypropylene.

A said control means is suitably selected so that it defines the rate determining step for passage of moisture, for example water vapour, from the container to the active material. Suitably, therefore, the rate of passage of moisture through the control means, towards the hydrogen generating means, is slower than the rate of passage of water through the hydrogen generating means (e.g. through a matrix material thereof as described below).

Preferably, to achieve the aforesaid, the ratio of the water vapour permeability (g.mm/m$^2$.day) of the control means to the water vapour permeability of the matrix is 1 or less, preferably 0.75 or less, more preferably 0.5 or less.

Preferably said control means comprises a material, for example a polymeric material, which has a water vapour permeability (g.mm/m$^2$.day) which is less than the water vapour permeability of said matrix material (preferably a said polymeric matrix material present in the greatest amount if more than one polymeric matrix material is included in said matrix) of said hydrogen generating means. The ratio of the water vapour permeability of the material, for example polymeric material, of said control means to the water vapour permeability of a said matrix material (preferably a said polymeric matrix material present in the greatest amount if more than one polymeric matrix material is included in said matrix) of said hydrogen generating means may be 1 or less, preferably 0.75 or less, more preferably 0.5 or less.

Said control means may comprise a layer of material, for example polymeric material, having a water vapour permeability of less than 2.0 g.mm/m$^2$.day, suitably less than 1.5 g.mm/m$^2$.day, preferably less than 0.8 g.mm/m$^2$.day, more preferably less than 0.4 g.mm/m$^2$.day.

Said control means may comprise a layer of polymeric material selected from HDPE, PP, LDPE, PET, EVA, SEBS and Nylon (e.g. Nylon-6).

Said control means may comprise a layer of material, for example polymeric material, having a thickness of at least 0.010 mm, preferably at least 0.025 mm, more preferably at least 0.045 mm. The thickness may be less than 0.5 mm, 0.2 mm or 0.1 mm.

Various means may be used to define control means for controlling passage of moisture. In one embodiment, said control means may comprise a single layer of material (e.g. sheet material) which is suitably positioned between said hydrogen generating means and a source of moisture in the container. Said single layer of material suitably comprises a polymeric material, as aforesaid The single layer may have a thickness of at least 0.010 mm, preferably at least 0.025 mm, more preferably at least 0.045 mm. The thickness may be less than 0.5 mm, 0.2 mm or 0.1 mm.

The material, for example polymeric material of the control means is suitably permeable to hydrogen and water vapour. Preferably, it is impermeable to by-products of the hydrogen generating means which could migrate into the container.

Crystallinity of the polymeric material may have an impact on moisture permeation. This can be understood by looking at the equation for crystallinity whereby:

$$P/Po=(1-c)/(1+c/2)$$

where P=permeation of the crystalline polymer, Po=permeation of the amorphous polymer and c=volume fraction crystallinity.

When the polymeric material comprises PET, the orientation of the polymer chains may have an impact on permeation, whereas for other polymeric materials, for example, polyolefins, the permeation is independent of chain orientation.

In another embodiment, said control means may comprise a plurality of layers which are suitably juxtaposed for example so they make face to face contact. The layers may be secured, for example laminated, to one another so that, together, they define a unitary control means, albeit comprising a plurality of layers. The plurality of layers are suitably positioned between said hydrogen generating means and a source of moisture in the container. Preferably, the rate of passage of water vapour through at least one of the layers is slower than the rate of passage of water vapour through the matrix of the hydrogen generating means.

The water vapour permeability of a control means comprising a plurality of layers can be calculated using the following equation:

$$P_T = \frac{L_T}{(L_A/P_A)+(L_B/P_B)+\ldots(L_n/P_n)}$$

Where:
$P_T$=total permeability
$P_{A-n}$=permeability of individual layers
$L_T$=total thickness of laminate
$L_{A-n}$=thickness of individual layers Said plurality of layers may together have a thickness of at least 0.010 mm, preferably at least 0.030 mm, especially at least 0.045 mm. In some cases, particularly wherein the plurality of layers includes a compressible layer, the thickness may be greater than 0.1 mm, greater than 0.3 mm or even greater than 0.5 mm. Said thickness of said plurality of layers may be less than 1 mm, suitably less than 0.7 mm. In one embodiment wherein a compressible layer is not included, said thickness may be less than 0.2 mm, preferably less than 0.1 mm.

When said control means includes a plurality of layers, the layers may be arranged to provide a range of different properties. For example, an exposed layer which is arranged to contact for example a neck of a container, in use, may have surface properties which are such as to modify the opening torque of a closure incorporating the control means. Also, the control means may include tie layers to bond layers to one another. Furthermore, a foam layer may be provided to adjust the compressibility of the control means.

Said plurality of layers may include any of the polymeric materials described above for said single layer.

Said control means, whether comprising a single layer or a plurality of layers, may be hydroscopic to encourage moisture to permeate; or may have a water-repellent surface, for example provided by coating with a silicone resin or a chlorocarbon. The control means could be permeable to water vapour, oxygen and hydrogen.

The hydrogen generating means may be arranged to slowly release molecular hydrogen inside the container over an extended period of time. In the presence of a suitable catalyst, the molecular hydrogen will react with any oxygen present in the interior of the container or in the container wall. Preferably, the rate of hydrogen release is tailored to match the rate of oxygen ingress into the container. In addition, it is preferable for there to be an initial relatively rapid release of hydrogen, followed by a slow continual release over a period of months or even years. Furthermore, it is preferred that substantial release of hydrogen reliably begins only when the package is filled. Finally, it is preferable that the substance releasing hydrogen does not adulterate the contents of the container.

The container suitably includes a catalyst for catalyzing a reaction between said molecular hydrogen and molecular oxygen. As a result, molecular oxygen in said container, for example which passes into said container through a wall thereof, may be scavenged, with water as a byproduct.

For purposes of this disclosure, a container includes any package that surrounds a product and that contains no intentional microscopic or macroscopic holes that provide for transport of small molecules between the interior and the exterior of the package. Said container optionally comprises a closure. For purposes of this disclosure, a catalyst includes any substance that catalyzes or promotes a reaction between molecular hydrogen and molecular oxygen.

The container may include a sidewall constructed from a composition that includes a polymer resin first component and a second component comprising a catalyst capable of catalyzing a reaction between molecular hydrogen and molecular oxygen. The hydrogen generating means is preferably located within the container or near an interior surface of the container. The hydrogen generating means is preferably located in or on a closure of said container.

When the hydrogen generating means includes a matrix material with which said active material is associated, the ratio of the weight of active material to matrix material may be at least 0.01, preferably at least 0.02. Preferably, the matrix is a polymeric matrix and said active material is dispersed therein. In general, once an active material is dispersed into a polymer, the rate of release of hydrogen is limited by the permeation rate of water into the polymeric matrix and/or by the solubility of water in the chosen matrix. Thus, selection of polymeric materials based on the permeability or solubility of water in the polymer allows one to control the rate of release of molecular hydrogen from active materials. However, by selection of appropriate control means, the rate determining step for release of hydrogen may be determined by properties of said control means, as described herein.

The polymeric matrix may include at least 1 wt % of active material, preferably at least 2 wt %. The polymeric matrix may include less than 70 wt % of active material. Suitably, the polymeric matrix includes 1-60 wt %, preferably 2-40 wt % of active material, more preferably 4-30 wt % of active material. The balance of material in the polymeric matrix may predominantly comprise a said polymeric material.

Said active material may comprise a metal and/or a hydride. A said metal may be selected from sodium, lithium, potassium, magnesium, zinc or aluminum. A hydride may be inorganic, for example it may comprise a metal hydride or borohydride; or it may be organic.

Active materials suitable for the release of molecular hydrogen as a result of contact with water include but are not limited to: sodium metal, lithium metal, potassium metal, calcium metal, sodium hydride, lithium hydride, potassium hydride, calcium hydride, magnesium hydride, sodium borohydride, and lithium borohydride. While in a free state, all of these substances react very rapidly with water; however, once embedded into a polymeric matrix, the rate of reaction proceeds with a half-life measured in weeks to months.

Other active substances may include organic hydrides such as tetramethyl disiloxane and trimethyl tin hydride, as well as metals such as magnesium, zinc, or aluminum. Where the rate of reaction between the active material and water is too slow, the addition of hydrolysis catalysts and/or agents are explicitly contemplated. For example, the rate of hydrolysis of silicon hydrides may be enhanced by the use of hydroxide or fluoride ions, transition metal salts, or noble metal catalysts.

It is also contemplated that the active material may also be the polymeric matrix. For example, polymeric silicon hydrides such as poly(methylhydro)siloxane provide both a polymeric matrix and an active substance capable of releasing molecular hydrogen when in contact with moisture.

The hydrogen generating means, for example active material, may be associated with a container in a variety of ways. Where a container includes a removable part, for example a closure, it may conveniently be associated with the closure. A closure may be releasably securable to a container body so that it can be removed and replaced, for example by being screw-threaded; or may be arranged to be removed but not replaced, for example by comprising a film which is adhered to a container body. In the latter case, the closure may comprise a film comprising a flexible "lidding" material as described hereinafter. In one embodiment, a container may include both a film closure which may provide an aseptic seal for the container and a releasably securable closure, both of which may independently include hydrogen generating means. After initial removal of both the releasably securable closure and the film closure, the releasably securable closure may be replaced and may generate hydrogen and therefore improve the storage life of the contents of the container.

When hydrogen generation occurs by reaction of the active substance with water, initiation of substantial hydrogen generation will occur only when the hydrogen generator is placed in a moisture-containing environment such as that found in most oxygen-sensitive foods and beverages. Thus initiation of hydrogen generation generally will coincide with the filling of the container and/or placement of the hydrogen generator into or near the interior of the container. In order to prevent or minimize hydrogen generation before this time, it is sufficient to minimize contact of the hydrogen generator with moisture. Unlike exclusion of molecular oxygen, exclusion of moisture is readily achieved by a number of methods, including but not limited to packaging the hydrogen generator and/or the structures containing the hydrogen generator in metal foil, metallized plastic, or polyolefin bags. For example, bulk packaging of closures containing hydrogen generating means in sealed polyethylene bags is an expedient way of limiting hydrogen generation prior to placement of the individual closures onto containers. Another method to limit contact of the hydrogen generator with moisture prior to placement of the individual closures onto containers is to place one or more dessicants inside the packaging with the closures.

Whilst in preferred embodiments, the source of moisture in the container for initiating hydrogen generation is a food or beverage contained within the container, other sources of moisture are contemplated. For example, a moisture generating means separate from the food or beverage may be associated with the container. Such a moisture generating means suitably comprises a high level of moisture. It may comprise a hydrogel which is associated with and/or is part of the container or another component within the container (e.g. a hydrated salt) which releases moisture on drying or in response to another stimulus, heating, exposure to visible or UV radiation, pressure change, microwave radiation, pH, electrical, magnetic field, ultrasound, etc.

Selection of suitable active substances for incorporation into a polymeric matrix can be based on a number of criteria, including but not limited to cost per kilogram, grams of $H_2$ generated per gram of active substance, thermal and oxidative stability of the active substance, perceived toxicity of the material and its reaction byproducts, and ease of handling prior to incorporation into a polymeric matrix. Of the suitable active substances, sodium borohydride is exemplary because it is commercially available, thermally stable, of relatively low cost, has a low equivalent molecular weight, and produces innocuous byproducts (sodium metaborate).

Because once released the molecular hydrogen will rapidly disperse throughout the interior of the container and permeate through all permeable portions of the container walls, the location of the hydrogen generating means (eg active substance-containing polymeric matrix) within the container is not critical. In general, however, it is desirable to locate the hydrogen generating means within the interior of the container in order to maximize the amount of hydrogen that is available for oxygen scavenging and minimize the amount of hydrogen generator required to obtain the desired degree of oxygen scavenging. Within the container, it is generally preferred to locate the hydrogen generating means in an opaque portion of the container. For example, in a beverage container made of transparent PET, location of the hydrogen generating means within the container closure is preferred. It is also generally preferred to locate the hydrogen generator behind a said control means of the type described.

In one embodiment, the hydrogen generator may be incorporated in a film which is part of a container and is arranged to be removed (and suitably not replaced) to allow access to the contents of the container. The film may comprise a laminate. It may include a layer which is substantially impermeable to oxygen for example a metal layer such as an aluminium layer. The film may include a hydrogen generating layer which includes a said hydrogen generating means. The distance between the hydrogen generating layer and the contents of the container is preferably less than the distance between a said impermeable layer of the film and the contents of the container. The film may include a layer which defines said control means, wherein the distance between the layer which defines said control means and the contents of the container is less than the distance between the hydrogen generating layer and the contents of the container. The film may be a lidding foil which is adhered to a container body to define a container.

Because the generated hydrogen will permeate through the container walls, the amount of hydrogen present within the container at any time is minimal. Moreover, the faster hydrogen is generated the faster it will permeate; hence significant increases in the rate of hydrogen generation (from, for example, increased container storage temperatures) will result in only modest increases in the concentration of hydrogen within the container. Because the permeability of hydrogen through a polymer is much greater than the permeability of oxygen, the amount of hydrogen in the headspace of the container may not need to exceed 4 volume percent, which is below the flammability limit for hydrogen in air. Furthermore, the solubility of hydrogen in food or beverages is low; hence at any time most of the hydrogen in the container will be in the headspace of the container. Hence, the amount of hydrogen that may be present within a container may be very small. For example, for a 500 ml PET beverage container with a 30 milliliter headspace volume and a 0.05 cc/package-day $O_2$ ingress rate, less than about 1 cc of hydrogen is needed within the container in order for the rate of $H_2$ permeation to be greater than the rate of oxygen ingress. In addition, the rate of $H_2$ generation would need to be only about 0.1-0.2 cc/day in order for enough hydrogen to be generated on an ongoing basis to react with most or all of the ingressing oxygen.

Because only small amounts of hydrogen need to be present inside the container in order to achieve high levels of oxygen scavenging, expansion and contraction of the container over time from the presence (or loss) of hydrogen is minimal. Consequently this technology is readily applicable to both rigid and flexible containers.

In order to facilitate the reaction between molecular hydrogen with molecular oxygen, a catalyst is desired. A large number of catalysts are known to catalyze the reaction of hydrogen with oxygen, including many transition metals, metal borides (such as nickel boride), metal carbides (such as titanium carbide), metal nitrides (such as titanium nitride), and transition metal salts and complexes. Of these, Group VIII metals are particularly efficacious. Of the Group VIII metals, palladium and platinum are especially preferred because of their low toxicity and extreme efficiency in catalyzing the conversion of hydrogen and oxygen to water with little or no byproduct formation. The catalyst is preferably a redox catalyst.

In order to maximize the efficiency of the oxygen scavenging reaction, it is preferable to locate the catalyst where reaction with oxygen is desired. For example, if the application requires that oxygen be scavenged before it reaches the interior of the container, incorporation of the catalyst in the package sidewall is desirable. Conversely, if scavenging of oxygen already present in the container is desired, it is generally preferable to locate the catalyst near or in the interior of the container. Finally, if both functions are desired, catalyst may be located both in the interior of the container and in the container walls. While the catalyst may be directly dispersed into the food or beverage, it is generally preferable that the catalyst be dispersed into a polymeric matrix. Dispersion of the catalyst into a polymeric matrix provides several benefits, including but not limited to minimization of food or beverage adulteration, minimization of catalyzed reaction between molecular hydrogen and food or beverage ingredients, and ease of removal and/or recycling of the catalyst from the food or beverage container.

A particular advantage of the present invention is that because of the extremely high reaction rates obtainable with a number of catalysts, very small amounts of catalyst may be required. A container may include 0.01 ppm to 1000 ppm, suitably 0.01 ppm to 100 ppm, preferably 0.1 ppm to 10 ppm, more preferably at least 0.5 ppm of catalyst relative to the weight of said container (excluding any contents thereof). In preferred embodiments, 5 ppm or less of catalyst is included. Unless otherwise stated reference to "ppm" refer to parts per million parts by weight.

The small amount of catalyst needed allows even expensive catalysts to be economical. Moreover, because very small amounts are required to be effective, there can be minimal impact on other package properties, such as color, haze, and recyclability. For example, when palladium is utilized as the catalyst, concentrations less than about 1 ppm of finely dispersed Pd may be sufficient to achieve acceptable rates of oxygen scavenging. In general, the amount of catalyst required will depend on and can be determined from the intrinsic rate of catalysis, the particle size of the catalyst, the thickness of the container walls, the rates of oxygen and hydrogen permeation, and the degree of oxygen scavenging required.

In order to maximize the efficacy of the catalyst, it is preferred that the catalyst be well dispersed. The catalyst can be either homogenous or heterogeneous. For homogeneous catalysts it is preferred that the catalysts be dissolved in a polymer matrix at a molecular level. For heterogeneous catalysts, it is preferred that the average catalyst particle size be less than 1 micron, more preferred that average catalyst particle size be less than 100 nanometers, and especially preferred than the average catalyst particle size be less than 10 nanometers. For heterogeneous catalysts, the catalyst particles may be free-standing, or be dispersed onto a support material such as carbon, alumina, or other like materials.

The method of incorporation of the catalyst is not critical. Preferred techniques result in a well dispersed, active catalyst. The catalyst can be incorporated into the container at any time prior to, during, or after the introduction of the hydrogen source. The catalyst can be incorporated into a polymeric matrix during polymer formation or during subsequent melt-processing of the polymer. It can be incorporated by spraying a slurry or solution of the catalyst onto polymer pellets prior to melt processing. It can be incorporated by injection of a melt, solution, or suspension of the catalyst into pre-melted polymer. It may also be incorporated by making a masterbatch of the catalyst with polymer and then mixing the masterbatch pellets with polymer pellets at the desired level before injection molding or extrusion. In containers wherein the catalyst is located in the interior of the container, the catalyst may be co-mingled with the active substance in the matrix of the hydrogen generator.

In a preferred embodiment, the catalyst is incorporated into a wall of the container. It is preferably associated with, for example dispersed in, a polymer which defines at least part of the wall of the container. In a preferred embodiment, the catalyst is associated with material which defines at least 50%, preferably at least 75%, more preferably at least 90% of the area of the internal wall of the container.

In a preferred embodiment, the catalyst is distributed substantially throughout the entire wall area of a container, optionally excluding a closure thereof.

The containers contemplated in the present invention may be either of a monolayer or a multilayer construction. In a multi-layered construction, optionally one or more of the layers may be a barrier layer. A non-limiting example of materials which may be included in the composition of the barrier layer are polyethylene co-vinyl alcohols (EVOH), poly(glycolic acid), and poly(metaxylylenediamine adipamide). Other suitable materials which may be used as a layer or part of one or more layers in either monolayer or multilayer containers include polyester (including but not limited to PET), polyetheresters, polyesteramides, polyurethanes, polyimides, polyureas, polyamideimides, polyphenyleneoxide, phenoxy resins, epoxy resins, polyolefins (including but not limited to polypropylene and polyethylene), polyacrylates, polystyrene, polyvinyls (including but not limited to poly(vinyl chloride)) and combinations thereof. Furthermore glassy interior and/or exterior coatings ($SiO_x$ and/or amorphous carbon) are explicitly contemplated as barrier layers. All of the aforementioned polymers may be in any desired combination thereof. Any and all of these materials may also comprise the container closure. In some cases, a container may comprise glass.

In a preferred embodiment, the container includes walls defined by polyester, for example PET and preferably catalyst is dispersed within the polyester.

The shape, construction, or application of the containers used in the present invention is not critical. In general, there is no limit to the size or shape of the containers. For example, the containers may be smaller than 1 milliliter or greater than 1000 liter capacity. The container preferably has a volume in the range 20 ml to 100 liter, more preferably 100 ml to 5 liter. Similarly, there is no particular limit to the thickness of the walls of the containers, the flexibility (or rigidity) of the containers, or the intended application of the containers. It is expressly contemplated that the containers include but are not limited to sachets, bottles, jars, bags, pouches, trays, pails, tubs, barrels, blister packs, or other like containers. Furthermore, the container may be located in the interior of another container, or have one of more containers located in the interior of the container. In preferred embodiments, the container may be any sealable container (plastic, glass, metal or hybrid construction) and may include sealable single and multilayer tray constructions (injection moulded or thermoformed), multi layer bags or pouches.

Said container may be arranged to protect an article from corrosion by scavenging oxygen within a container which contains an article susceptible to corrosion. The container may be used to protect sensitive electronic components or devices.

Said container may include a permeable wall comprising of one or more polymers that have in the absence of any oxygen scavenging a permeability between about $6.5 \times 10^{-7}$ $cm^3$-cm/($m^2$-atm-day) and about $1 \times 10^4 cm^3$-cm/($m^2$-atm-day).

In general, the hydrogen generator can be formed into any shape suitable for incorporation into a container. Specific shapes contemplated include but are not limited to pellets, disks, films, fiber, woven fabric, non-woven fabric, and powders.

It is generally desirable to tailor the length of time hydrogen will be released from the hydrogen generator to be similar to or greater than the desired shelf-life of the product that is to be protected from oxygen ingress. Tailoring the length of time hydrogen will be released can be done by adjusting properties of the control means and/or polymeric matrix. It is also desirable to tailor the rate of hydrogen generation to be equal to or somewhat greater than two times the rate of oxygen ingress, since the overall reaction is $2H_2 + O_2 \rightarrow 2H_2O$.

The hydrogen generating means is suitably arranged to generate hydrogen for an extended period of time, for example at least 100 days, preferably at least 180 days, more preferably at least 270 days, especially at least 365 days. The aforementioned periods may be assessed after storage at room temperature (22° C.) and ambient pressure.

It may also be preferred to scavenge oxygen that is initially present in the container or the food or beverage. To do so it is preferred that the hydrogen generator initially release hydrogen at an enhanced rate. In these instances, it is also preferred that a catalyst be located in or near the interior of the container.

It is expressly contemplated that there may be a plurality of hydrogen generators provided, each with independently controllable hydrogen generation rates. By providing a plurality of hydrogen generators, the rate of hydrogen generation within a container can be tailored to meet any desired profile. Also, different active materials may be associated with the container for generating hydrogen. These may be provided as a random mixture in a single hydrogen generating layer or may be arranged in separate layers. It is also contemplated that in addition to providing at least one hydrogen generator, molecular hydrogen may be added to the interior of the container at the time of sealing.

In a further embodiment, a closure which includes hydrogen generating means may be used to replace an existing closure of a container to increase the rate of hydrogen generation in the container and/or to provide a means of oxygen scavenging or enhanced oxygen scavenging in the container. For example, such a closure may replace an existing closure which has and never had any means of generating hydrogen—it may be a conventional inactive closure. This may provide a means for a customer to enhance domestic storage life of an oxygen sensitive product. Alternatively, such a closure may replace an existing closure which includes (or included) a means for generating hydrogen but wherein the rate is less than optimum, for example due to the age of the closure and/or the time it has been generating hydrogen.

When the existing closure replaced is one which has never had any means of generating hydrogen, said closure may incorporate both a means of generating hydrogen and a catalyst for catalyzing a reaction between molecular hydrogen and molecular oxygen. In this case, the closure may suitably be protected prior to use by means which prevents or restricts moisture access to the hydrogen generator. Such means may comprise a foil or other impermeable material which is associated with the closure and arranged to prevent passage of moisture to the hydrogen generator.

When an existing closure is replaced, the replacement closure may be similar to the closure removed. When the catalyst is located in a wall of the container, the closure may have no catalyst and may only include said means for generating hydrogen. Thus, in the latter case, the method may comprise renewing or recharging the hydrogen generating ability of a container by replacing an existing closure with a new closure which includes a means of generating hydrogen which is enhanced compared to the closure replaced.

The container may include a product, which suitably includes a source of moisture. The product may be for human consumption; it may be a food or beverage, the latter being especially preferred.

According to a second aspect of the invention, there is provided an assembly comprising:
(i) a hydrogen generating means comprising an active material arranged to generate molecular hydrogen on reaction with moisture;
(ii) a control means for controlling passage of moisture to the hydrogen generating means.

The hydrogen generating means and control means of the second aspect may have any features of the hydrogen generating means and control means of the first aspect.

Said hydrogen generating means may be provided in a first part, for example layer, of the assembly. Said control means may be provided in a second part, for example layer, of the assembly. Said first and second parts may make face to face contact. Said assembly may comprise a laminate.

Said assembly may be in the form of a liner for a closure.

Said assembly may be disc-shaped. Said assembly may have a substantially circular cross-section.

Said hydrogen generating means may be encapsulated in a said control means.

Although it is preferred that the assembly of the second aspect is associated with a container, it need not be and may have more general applications. The assembly may be used in any situation wherein it is desired to control the release of hydrogen into another media or environment. The media or environment may be a vacuum, head space, liquid phase or polymer phase. The release of hydrogen may be for any purpose (not solely for oxygen scavenging) and may include any chemical, electrochemical or biological process, wherein a controlled source of hydrogen is required. In one embodiment, an assembly which may be in the form of a solid body, may be introduced into a liquid medium such as of a chemical reaction, in order to release hydrogen.

According to a third aspect of the invention, there is provided a closure for a container, said closure comprising an assembly according to the second aspect.

Said assembly is suitably arranged as a liner for the closure.

According to a fourth aspect of the invention, there is provided a method of making an assembly according to the second aspect, the method comprising associating a said hydrogen generating means and a said control means.

The method preferably comprises heating at least one or either a first composition comprising said hydrogen generating means or a second composition comprising said control means and associating the two compositions when at least one is at an elevated temperature, for example at greater than 50° C., suitably at greater than 100° C.

Preferably, both compositions are heated. Preferably, said first and second compositions are co-extruded, suitably so that the two compositions contact one another to produce adjacent first and second layers of a co-extrusion.

The method may comprise encapsulating said hydrogen generating means in said control means.

According to a fifth aspect, there is provided a method of making a closure according to the third aspect, the method comprising associating a hydrogen generating means and a control means with closure material.

The closure material may include means arranged to secure the closure to a container body. For example, the closure material may include securement means, for example a screw-threaded region, for securing the closure to a container body.

Suitably, an assembly according to the second aspect is provided and is associated with said closure material. Where said assembly comprises a liner for a closure, the method may comprise securing the liner to the closure material, for example within an opening in the closure material.

According to a sixth aspect, there is provided a method of making a container according to the first aspect, the method comprising associating a hydrogen generating means and a control means with a part of a container.

In one embodiment, said hydrogen generating means and/or said control means may be associated with a closure and said part of said container may be a container body to which the closure is arranged to be releasably secured.

According to a seventh aspect, there is provided the use of a control means for controlling passage of moisture from a source of moisture (e.g. in a container) to a hydrogen generating means (e.g. associated with the container), wherein said hydrogen generating means comprises an active material arranged to generate molecular hydrogen on reaction with moisture.

According to an eighth aspect, there is provided the use of a control means for reducing the rate of hydrogen generation by a hydrogen generating means (e.g. in a container), wherein said hydrogen generating means comprises an active material arranged to generate molecular hydrogen on reaction with moisture and said control means is positioned between a source of moisture (e.g. in the container) and said hydrogen generating means.

According to a ninth aspect, there is provided a method of controlling passage of moisture from a source of moisture (e.g. in a container) to a hydrogen generating means (e.g. associated with the container), the method comprising positioning a control means between a source of moisture and a hydrogen generating means.

According to a tenth aspect, there is provided a method of reducing the rate of hydrogen generation by a hydrogen generating means (e.g. associated with a container), the method comprising positioning a control means between a source of moisture (e.g. in the container) and said hydrogen generating means.

According to an eleventh aspect, there is provided the use of a control means for extending shelf-life of a product in a container, wherein the control means controls passage of moisture from a source of moisture in the container to a hydrogen generating means associated with the container, wherein said hydrogen generating means comprises an active material arranged to generate molecular hydrogen on reaction with moisture.

According to a twelfth aspect, there is provided a method of extending shelf-life of a product in a container, the method comprising positioning a control means between a source of moisture in the container and a hydrogen generating means associated with the container, wherein said hydrogen generating means comprises an active material arranged to generate molecular hydrogen on reaction with moisture.

According to a thirteenth aspect, there is provided a method of reducing the rate of change of hydrogen generation with time of a hydrogen generating means (e.g. associated with a container), the method comprising positioning a control means between a source of moisture (e.g. in the container) and the hydrogen generating means (e.g. associated with the container), wherein said hydrogen generating means comprises an active material arranged to generate molecular hydrogen on reaction with moisture.

According to a fourteenth aspect, there is provided the use of a control means for reducing the rate of change of hydrogen generation with time by a hydrogen generating means (e.g. in a container), wherein said hydrogen generating means comprises an active material arranged to generate molecular hydrogen on reaction with moisture and said control means is positioned between a source of moisture (e.g. in the container) and said hydrogen generating means.

Any feature of any aspect of any invention or embodiment described herein may be combined with any feature of any aspect of any other invention or embodiment described herein mutatis mutandis.

Specific embodiments of the invention will now be described, by way of example, with reference to the accompanying drawings, in which:

FIG. 1 is a cross-section through a perform;

FIG. 2 is a cross-section through a bottle;

Figure 3:
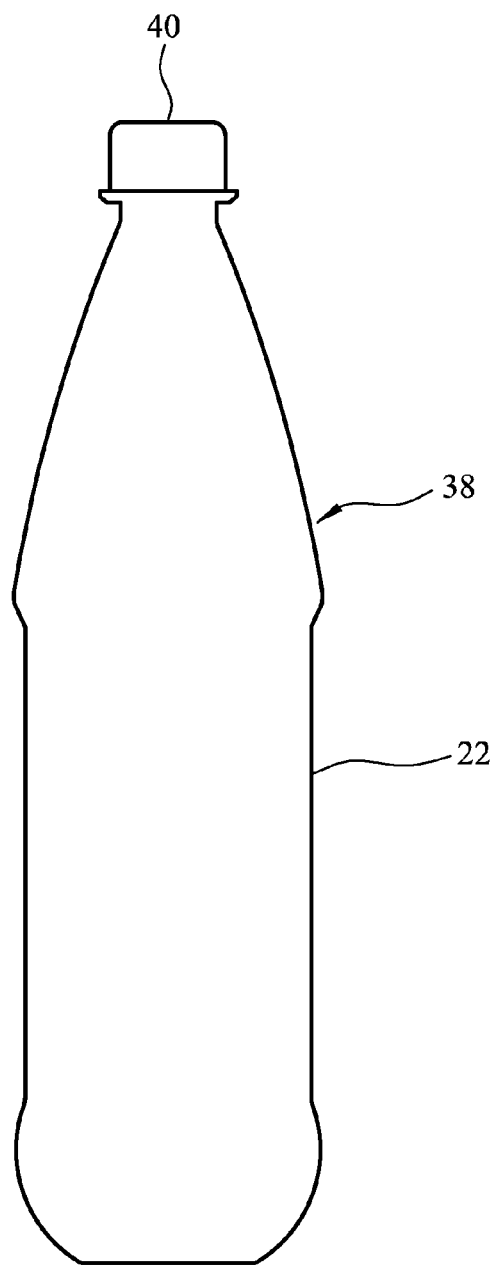
FIG. 3 is a side elevation of a bottle including a closure.

A preform 10 illustrated in FIG. 1 can be blow molded to form a container 22 illustrated in FIG. 2. The container 22 comprises a shell 24 comprising a threaded neck finish 26 defining a mouth 28, a capping flange 30 below the threaded neck finish, a tapered section 32 extending from the capping flange, a body section 34 extending below the tapered section, and a base 36 at the bottom of the container. The container 10 is suitably used to make a packaged beverage 38, as illustrated in FIG. 3. The packaged beverage 38 includes a beverage. The beverage may be a carbonated beverage or non-carbonated beverage. Examples of suitable beverages include soda, beer, wine, fruit juices, and water. In one particular embodiment, the beverage is an oxygen sensitive beverage. In another embodiment, the beverage is a vitamin C containing beverage such as a vitamin C containing fruit juice, a beverage which has been fortified with vitamin C, or a combination of juices in which at least one of the juices includes vitamin C. In this embodiment, the beverage is disposed in the container 22 and a closure 40 seals the mouth 28 of container 22.

Figure 4:
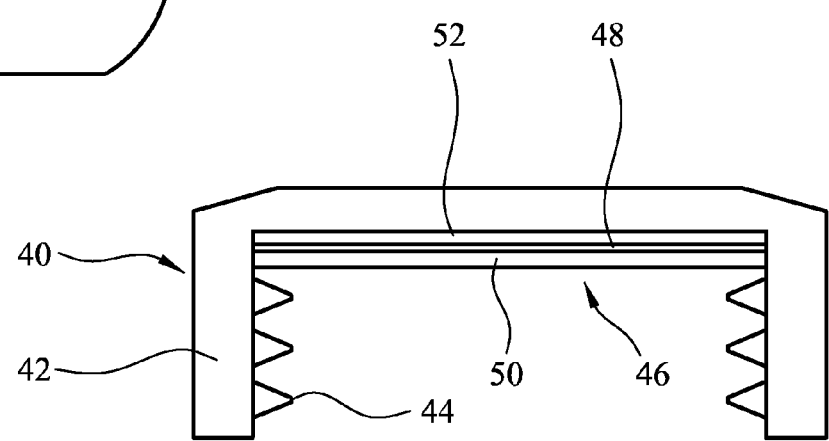
FIG. 4 is a closure, partly in cross-section.

Referring to FIG. 4, a closure 40 includes a body 42 with a screw-threaded portion 44 for screw-threadedly engaging the closure with threaded neck finish 26. Inwards of the portion 44 is a liner 46 comprising a hydrogen generating device. The liner 46 includes one layer 48 which incorporates a hydride dispersed in a polymeric matrix. On opposite sides of layer 48 are arranged PET layers 50, 52. The PET layer 50 which is closest to the contents of the container in use, is arranged to act as a control layer to control the rate of passage of water vapour from the beverage in the container to the hydride-containing layer 48.

The shell 24 of the container includes a catalyst. The catalyst may be dispersed in the polymer matrix, for example PET, which defines the shell 24 by injection molding polymeric matrix material and catalyst, for example a palladium compound, to define a perform 10 which is subsequently blow molded to define the container 22.

In use, with container 22 including a beverage and closure 40 in position, the headspace in the container will be saturated with water vapor. This vapor passes through layer 50 and contacts the hydride associated with layer 48 and as a result the hydride produces molecular hydrogen which migrates into the polymer matrix of shell 24 and combines with oxygen which may have entered the container through its permeable walls. A reaction between the hydrogen and oxygen takes place, catalysed by the catalyst, and water is produced. Thus, oxygen which may ingress the container is scavenged and the contents of the container are protected from oxidation. The scavenging effect may be maintained for as long as hydrogen is produced in the container and such time may be controlled by inter alia varying the amount of hydride in the plug 42.

The following examples illustrate how the nature and/or properties of the control layer may varied to control the rate of hydrogen production by the layer 48.

Materials

EVA—ethylvinylacetate copolymer (Ateva 1070) with vinyl acetate content of 9% and a melt flow index of 2.8 g/10 min (ASTM), was dried at 93° C. for approximately 2 in a forced air desiccant dryer to a moisture content of less than 100 ppm (Computrac MAX 2000L moisture Analyser).

Sodium Borohydride (Venpure SF) from Rohm & Hass was used as received.

RLE-005—Extrusion coated Polyester film from Amcor Flexibles (0.0122 mm PET/0.0508 mm LDPE)

EXAMPLE 1

Sodium Borohydride/EVA Compound 2.4 kg of Sodium borohydride (8 wt %) was compounded with 27.6 kg of Ateva 1070 (92 wt %) on a 30 mm Werner-Pfleiderer twin screw extruder under a nitrogen blanket. The feed zone temperature was set at 26° C. and the other 10 zones of the extruder were set at 160° C. The compound was pelletised, dried and stored in a dry nitrogen atmosphere in a sealed foil bag.

EXAMPLE 2

Comparative

A sheet comprising a three layer laminate comprising respective layers of the compound of Example 1, LDPE and PET was prepared by extruding a sheet from the compound of Example 1 and laminating it onto the LDPE face of RLE-005 to form a three layer construction. The thicknesses of each layer were as follows: 0.686 mm compound of Example 1, 0.0508 mm LDPE, 0.0122 mm PET. Total thickness of the extruded three-layer sheet was 0.749 mm.

EXAMPLE 3

A sheet comprising a five layer laminate comprising respective layers of PET, LDPE, the compound of Example 1, LDPE, PET was prepared by extruding a sheet from the compound of Example 1 and laminating onto both faces sheets of RLE-005, such that both layers of LDPE are bonded to respective sides of the sheet made from the compound of Example 1. The thicknesses of each layer were as follows: 0.686 mm compound of Example 1, 0.0508 mm LDPE tie layers, 0.0122 mm PET layers. Total thickness of the five-layer sheet was 0.812 mm.

EXAMPLE 4

A sheet comprising a three-layer laminate comprising respective layers of EVA, the compounds of Example 1 and EVA was prepared by co-extruding a layer of the compound of Example 1, sandwiched between two layers of EVA. The thicknesses of each layer were as follows: 0.0726 mm EVA, 0.6604 mm compound of Example 1, 0.0726 EVA; total sheet thickness 0.8128 mm.

The materials of Examples 2 to 4 were assessed as described in Example 5.

EXAMPLE 5

Rectangular strips (approximately 5 cm×1.5 cm) were cut from the sheets prepared in Examples 2 to 4. Each sample was accurately weighed in grams to 2 decimal places. Each sample was wedged into the bottom of a 100 ml graduated, glass gas-burette which was inverted and placed into a water-filled one litre beaker. The burette was filled with water to just below the sample by inserting a 3 mm flexible polyethylene tube to the top of the burette and removing the air with a syringe attached to the other end of the polyethylene tube. The hydrogen produced was measured by noting the amount of water displaced from each tube over time.

Figure 5:
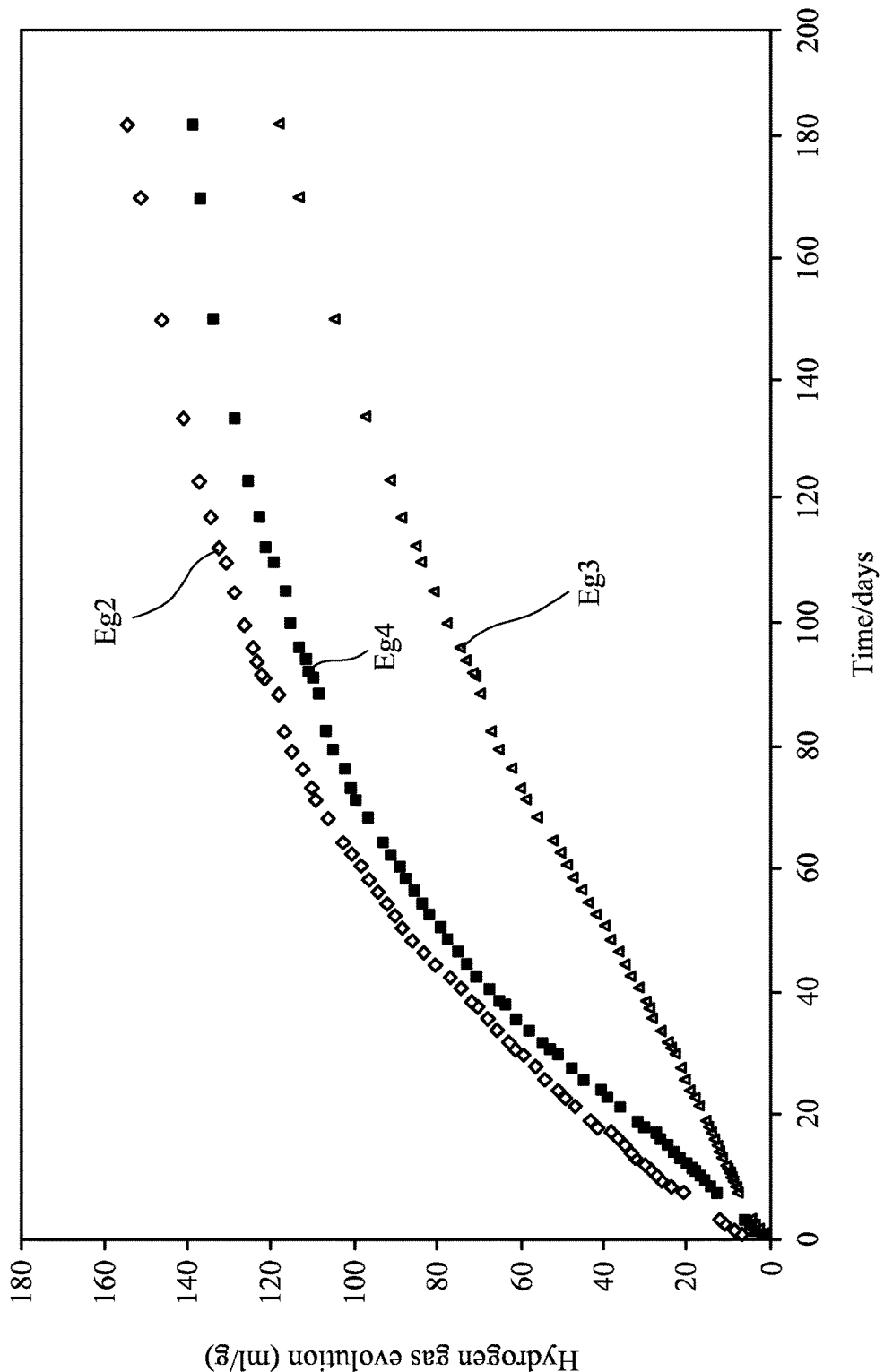
FIG. 5 is a graph of hydrogen gas evolution over time for different liner materials.

The hydrogen gas evolution results for examples 2 to 4, expressed as ml of gas per gram of sample (ml/g) are shown in FIG. 5. The results clearly show that facing both sides of the hydrogen generating layer with EVA barrier layers controls the rate of hydrogen generation and facing both sides with PET/HDPE tie-layer produces additional control. The average $H_2$ release rate between 5 & 10 days exposure to moisture vapour is reduced from 2.23 to 1.74 ml/g.day using the EVA control barrier and is further reduced to 0.67 ml/g.day when LDPE/PET control barrier is used. Surprisingly, however, the control barriers have the opposite effect on the average $H_2$ release rate between 95-100 day exposure to water vapour—using the EVA control barrier produced an increase from 0.47 to 0.52 ml/g.day and using the LDPE/

PET control barrier produced a further increase to 0.64 ml/g.day. This surprising H₂ moderating effect of the water vapour control barrier can be seen in the ratio of the 5-10 day average $H_2$ rate over the 95-100 day average $H_2$ rate i.e. as the effectiveness of the barrier is increased the ratio is reduced. Also, particularly as regards Example 3, the ratio based on the 175-180 rate (final column) is relatively unchanged from the ratio based on the 95-100 day values, illustrating how the barrier may be used to achieve especially long shelf-life. Consequently, the control barrier can be used to maximise the time period for effective oxygen scavenging and thus resulting in longer pack shelf-life-time for oxygen sensitive products.

| Example | Average 5-10 day $H_2$ rate (ml/g · day) | Average 95-100 day $H_2$ rate (ml/g · day) | Average 175-180 day $H_2$ rate (ml/g · day) | 5-10/95-100 rate Ratio | 5-10/175-180 rate Ratio |
|---|---|---|---|---|---|
| 2 (comparative) | 2.23 | 0.47 | 0.22 | 4.75 | 10.14 |
| 4 (EVA barrier) | 1.74 | 0.52 | 0.20 | 3.36 | 8.70 |
| 3 (PET barrier) | 0.67 | 0.64 | 0.41 | 1.06 | 1.63 |

A range of different materials may be used as control layers in liners 46. Materials for control layers are suitably selected so that the water permeability of the control layer is less than the water permeability of the polymeric matrix in which the hydride is dispersed. The following materials may be used in a control layer with an appropriate polymeric matrix incorporating a hydride.

TABLE 1

Literature values for the water permeability of various homo and copolymers.

| Polymer | Water vapor permeability (g · mm/m² · day) |
|---|---|
| Poly(vinylidene chloride)—Saran | 0.01[a] |
| Poly(tetrafluorethylene-co-ethylene) Hostaflon ET | 0.02[a] |
| High Density Polyethylene (DuPont Sclair 19A) | 0.13 |
| Polyethylene-acrylic acid colpomer (EAA) BASF Lucalen A2910M (11% acrylic acid content) | 0.23 |
| Low density polyethylene—Dow LDPE 722 (MFI 8 g/10 min @ 190° C.) | 0.26 |
| Ethylene-tetrafluoroethylene copolymers—DuPont Tefzel T² | 0.3 |
| Unplasticized poly(vinyl chloride) | 0.36[a] |
| Polypropylene (PP)—BASELL ADSYL 3C37F | 0.45[b] |
| Low density polyethylene—Dow LDPE 4005 (MFI 5.5 g/10 min @ 190° C.) | 0.46[b] |
| Poly(ethylene teraphthalate) | 0.39-0.51 |
| Polybutylene (PB) Shell Chemical Duraflex 1600 (density 0.91 g/cm³) | 0.47[b] |
| Ethylene-vinyl alcohol copolymer (EVOH)—Eval E (44 mole % ethylene content) | 0.6[b] |
| EVA—DuPont Elvax 3120 (7.5% VA content) | 0.74[b] |
| Poly(methyl methacrylate) | 0.84[a] |
| Poly(vinyl butyral) | 1.06[a] |
| EVA—DuPont Elvax 3130 (12% VA content) | 1.1[b] |
| Styrene-butadiene block copolymers (SBS) BASF AG Styrolux 656C | 1.13[b] |
| Nylon 6—BASF Ultramid B4 (unstretched) | 1.15[b] |
| General Purpos Polystyrene—BASF AG Polystyrol 168N | 1.2[b] |
| EVA—DuPont Elvax 3123 (15% VA content) | 1.6[b] |
| Poly(carbonate) | 1.83[a] |
| Acrylonitrile-methyl acrylate copolymer BP Chemicals BAREX 210 | 2.0[b] |
| EVA—DuPont Elvax 3165 (18% VA content) | 2.0[b] |
| Polybutylene Terephthalate (PBT) BASF AG Ultradur B 4550 | 2.5[b] |
| Ethylene-vinyl alcohol copolymer (EVOH)—Eval L (27 mole % ethylene content) | 3.2[b] |
| Acrylonitrile-styrene-acrylate copolymer—BASF AG Luran S 776S | 3.5[b] |
| Poly(ethyl methacrylate) | 4.16[a] |
| Acrylonitrile-butadiene-styrene copolymer—GE Plastics Cycolac | 5.9[b] |

[References:
[a]Polymer Handbook (4th Ed) table 1, page VI/545),
[b]Permeability Properties of Plastics & Elastomers—A guide to Packaging & Barrier Materials, 2ⁿᵈ Edition, Edited by Liesl K. Massey, Published by Plastics Design Library, 2003]

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A container comprising:
   a container body;
   contents of the container being contained in the container body, wherein the contents comprise a source of moisture;
   a closure which is removable from the container body;
   an active material associated with said closure and arranged to generate molecular hydrogen on reaction with moisture from said source of moisture, wherein said active material is associated with a matrix material, and wherein said active material and matrix material are configured to release hydrogen inside the container; and a control layer positioned between said source of moisture and said active material, said control layer being arranged to control passage of moisture from said source of moisture in the container to the active material, wherein said control layer comprises a polymeric material selected from HDPE, PP, LDPE, PET, EVA, SEBS, and Nylon;

wherein said active material is incorporated in a film which defines a hydrogen generating layer;

wherein said film incorporates a layer which defines said control layer;

wherein the distance between the layer which defines said control layer and the contents of the container is less than the distance between the hydrogen generating layer and the contents of the container; and wherein said control layer has a thickness of at least 0.010 mm.

2. A container according to claim 1, wherein said control layer is arranged to control a first evolution ratio, wherein the first evolution ratio is defined as:

$$\frac{\text{the rate of evolution of hydrogen in the container over a selected initial 5 day period}}{\text{the rate of evolution of hydrogen in the container over a second 5 day starting 85 days after the end of the selected initial period}}$$

wherein said first evolution ratio is greater than 0.5 and is less than 4.

3. A container according to claim 2, wherein said first evolution ratio is greater than 0.5 and less than 2.

4. A container according to claim 2, wherein said control layer is arranged to control a second evolution ratio, wherein the second evolution ratio is defined as:

$$\frac{\text{the rate of evolution of hydrogen in the container over a selected initial 5 day period}}{\text{the rate of evolution of hydrogen in the container over a second 5 day period starting 180 days after the end of the selected initial period}}$$

and said control layer is arranged to control a third evolution ratio, wherein the third evolution ratio is defined as:

$$\frac{\text{the rate of evolution of hydrogen in the container over a selected initial 5 day period}}{\text{the rate of evolution of hydrogen in the container over a second 5 day period starting 270 days after the end of the selected initial period}}$$

wherein said second evolution ratio is greater than 0.5 and is less than 2; and said third evolution ratio is greater than 0.5 and is less than 2.

5. A container according to claim 2, wherein said active material is dispersed in said matrix.

6. A container according to claim 1, wherein said matrix material has a water vapour permeability of greater than 0.2 g.mm/m².day and a permeability of less than 5 g.mm/m².day.

7. A container according to claim 1, wherein said matrix material includes 1-60 wt % of active material which comprises a metal and/or a hydride.

8. A container according to claim 1, wherein said control layer is selected so that it defines the rate determining step for passage of moisture from the container to the active material; or wherein the ratio of the water vapour permeability of the control layer to the water vapour permeability of the matrix material is 0.75 or less.

9. A container according to claim 1, wherein the ratio of the water vapour permeability of a polymeric material of said control layer to the water vapour permeability of a matrix material with which said active material is associated is 0.75 or less.

10. A container according to claim 1, wherein said control layer comprises a layer of material having a water vapour permeability of less than 0.8 g.mm/m².day.

11. A container according to claim 1, wherein said control layer comprises a plurality of layers which make face to face contact so that, together, they define a unitary control means.

12. A container according to claim 11, wherein the rate of passage of water vapour through at least one of the layers is slower than the rate of passage of water vapour through said matrix material.

13. A container according to claim 1, wherein said control layer includes a plurality of layers, including an exposed layer arranged to contact a neck of a container in use and a foam layer to adjust the compressibility of the control layer.

14. A container according to claim 1, wherein said container includes a sidewall constructed from a composition that includes a polymer resin first component and a second component comprising a catalyst capable of catalyzing a reaction between molecular hydrogen and molecular oxygen.

15. A container according to claim 1, wherein said active material is incorporated in a film which is part of a container and is arranged to be removed to allow access to the contents of the container, wherein said film includes a layer which defines said control layer.

16. A container according to claim 15, wherein the film is a lidding foil which is adhered to a container body to define a container.

17. A container according to claim 1, wherein a catalyst is incorporated into a wall of the container.

18. A container according to claim 1, wherein said active material is arranged to generate hydrogen for at least 270 days.

19. A container according to claim 1, wherein said container comprises an assembly comprising:
(i) said active material associated with said matrix material; and
(ii) said control layer wherein said control layer is permeable to hydrogen and water vapour;
wherein said active material is provided in a first layer of the assembly and said control layer is provided in a second layer of the assembly; and
wherein said assembly comprises a laminate.

20. A container according to claim 19, wherein said assembly is in the form of a liner for a closure.

21. A container according to claim 1, wherein said container comprises an assembly comprising:
(i) said active material associated with said matrix material; and
(ii) said control layer, wherein said control layer is permeable to hydrogen and water vapour;

wherein said active material is provided in a first part of the assembly, said control layer is provided in a second part of the assembly; and wherein said first and second parts make face to face contact.

22. A container according to claim 1, wherein said control layer comprises a layer of material having a water vapour permeability of less than 2.0 g.mm/m$^2$.day.

23. A container according to claim 1, said container comprising an assembly, wherein said active material is provided in a first layer of the assembly and said control layer is provided in a second layer of the assembly;

wherein said assembly comprises a laminate; and wherein said first and second layers make face to face contact.

24. A container according to claim 1, wherein said control layer has a thickness of less than 0.5 mm.

25. A container comprising:

a container body;

a closure which is removable from the container body;

a product for human consumption contained within the container body, wherein said product comprises a source of moisture;

an active material associated with said closure and being arranged to generate molecular hydrogen on reaction with moisture from said product, wherein said active material is associated with a matrix material, and wherein said active material and matrix material are configured to release hydrogen inside the container body; and a control layer positioned between said product and said active material, said control layer being arranged to control passage of moisture from said product in the container body to the active material, wherein said control layer comprises a polymeric material selected from HDPE, PP, LDPE, PET, EVA, SEBS, and Nylon;

wherein said active material is incorporated in a film which defines a hydrogen generating layer;

wherein said film incorporates a layer which defines said control layer;

wherein the distance between the layer which defines said control layer and said product is less than the distance between the hydrogen generating layer and said product; and wherein said control layer has a thickness of at least 0.010 mm.

26. A container according to claim 25, wherein said control layer has a thickness of less than 0.5 mm.

* * * * *